UNITED STATES PATENT OFFICE.

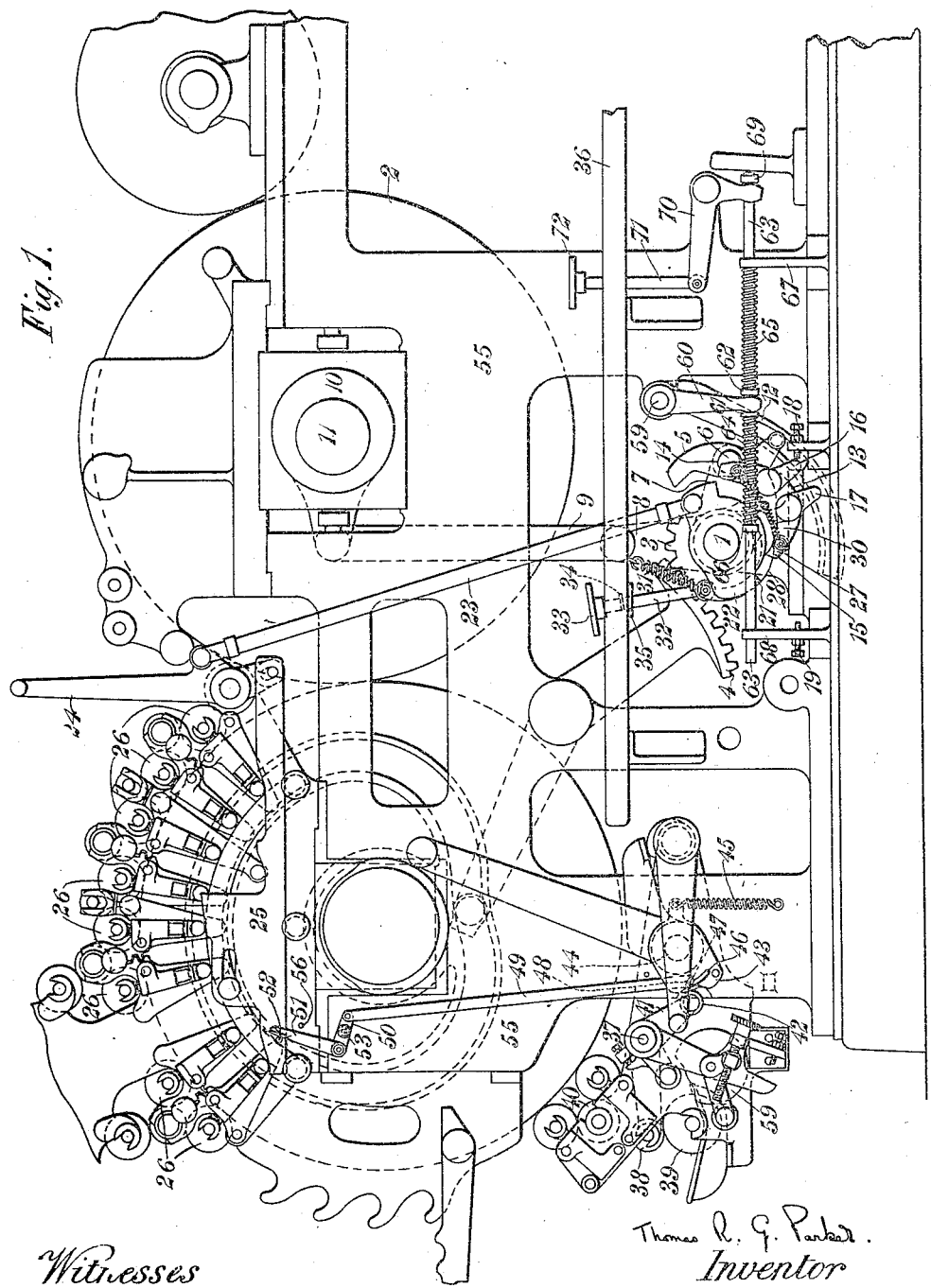

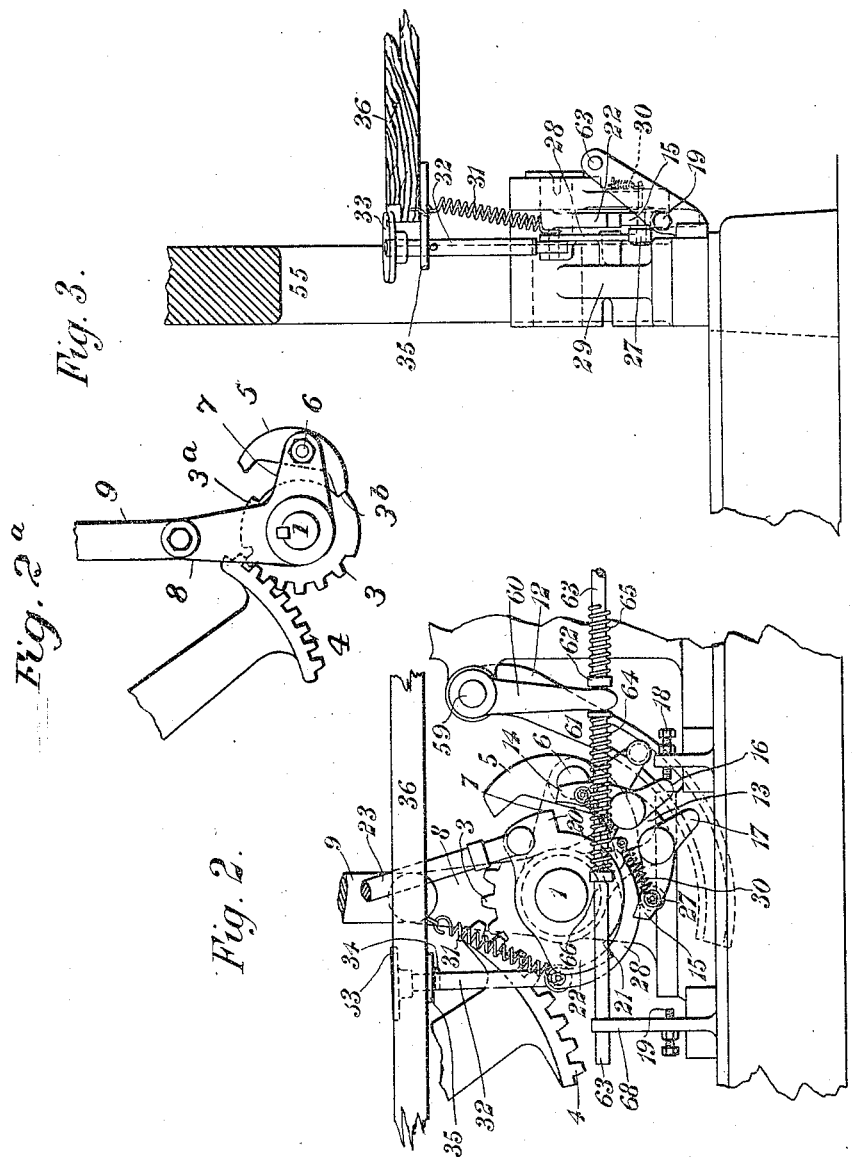

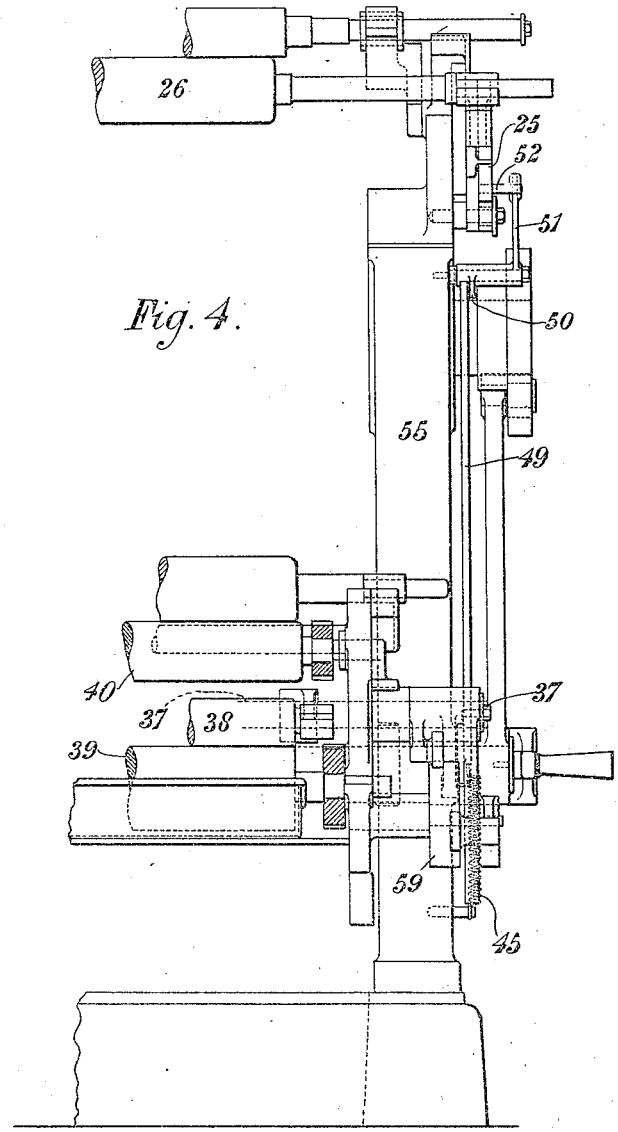

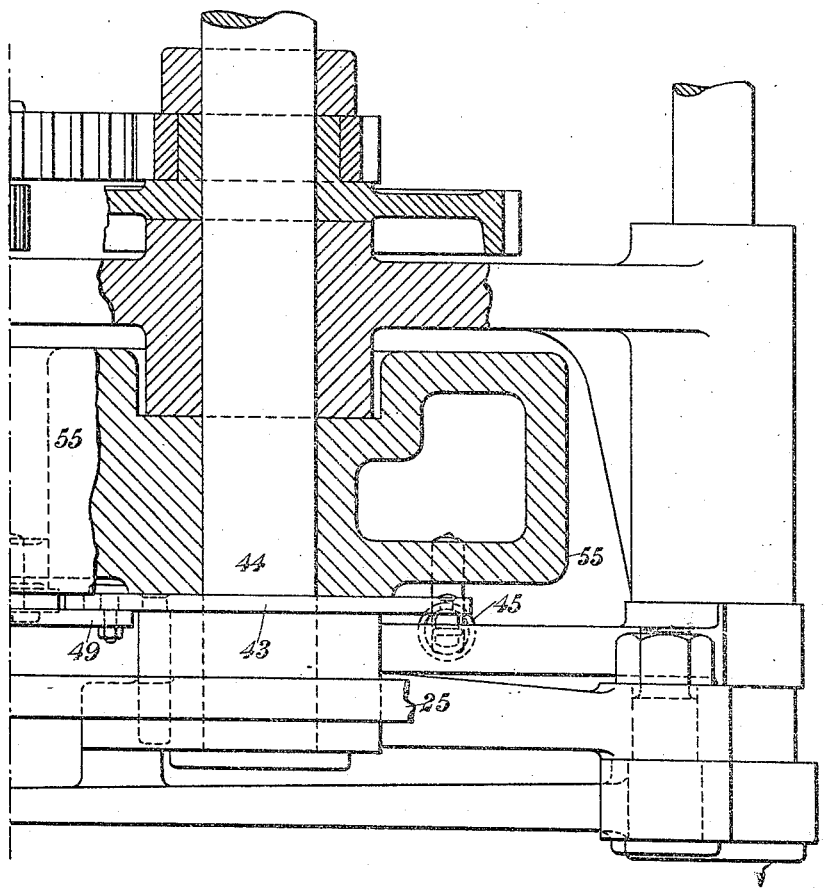

THOMAS ROBERT GILLETT PARKER, OF BROADHEATH, ENGLAND, ASSIGNOR TO LINOTYPE AND MACHINERY LIMITED, OF LONDON, ENGLAND.

PRINTING-MACHINE.

951,217. Specification of Letters Patent. Patented Mar. 8, 1910.

Application filed March 18, 1907. Serial No. 362,981.

*To all whom it may concern:*

Be it known that I, THOMAS ROBERT GILLETT PARKER, a subject of the King of the United Kingdom of Great Britain and Ireland, residing at The Linotype Works, Broadheath, in the county of Chester, England, have invented new and useful Improvements in Printing-Machines, of which the following is a specification.

This invention relates to improvements connected with the inking, tripping and damping mechanisms of rotary printing machines, the improvements connected with the inking mechanism and its tripping mechanism being applicable to any rotary machine using either a typographic printing surface or a flexible metal plate as a printing surface, while the improvements connected with the damping mechanism are applicable only to machines printing on the lithographic plan from any suitable metallic, stone, or other surface.

In the specifications of Letters Patent Nos. 773,969 and 773,970 both dated November 1st 1904 means are described whereby the tripping of the impression cylinder is caused also to automatically effect the tripping of the inking rollers, coincidently therewith, the inking rollers remaining tripped as long as the impression cylinder remains so. This has sometimes been found very inconvenient as it does not readily allow of the double rolling of the printing surface which is so often required. This double rolling has heretofore been done by either tripping the machine at alternate impressions and lowering the inking rollers by hand immediately after they have been tripped, or disconnecting the roller-trip gear from the cylinder trip gear which is a troublesome operation and cannot be effected while the machine is in motion.

The present invention provides means for overcoming these difficulties and it also provides among other advantages for the automatic stopping of the supply of water to the printing surface simultaneously with the tripping of the inking rollers.

Figure 5:
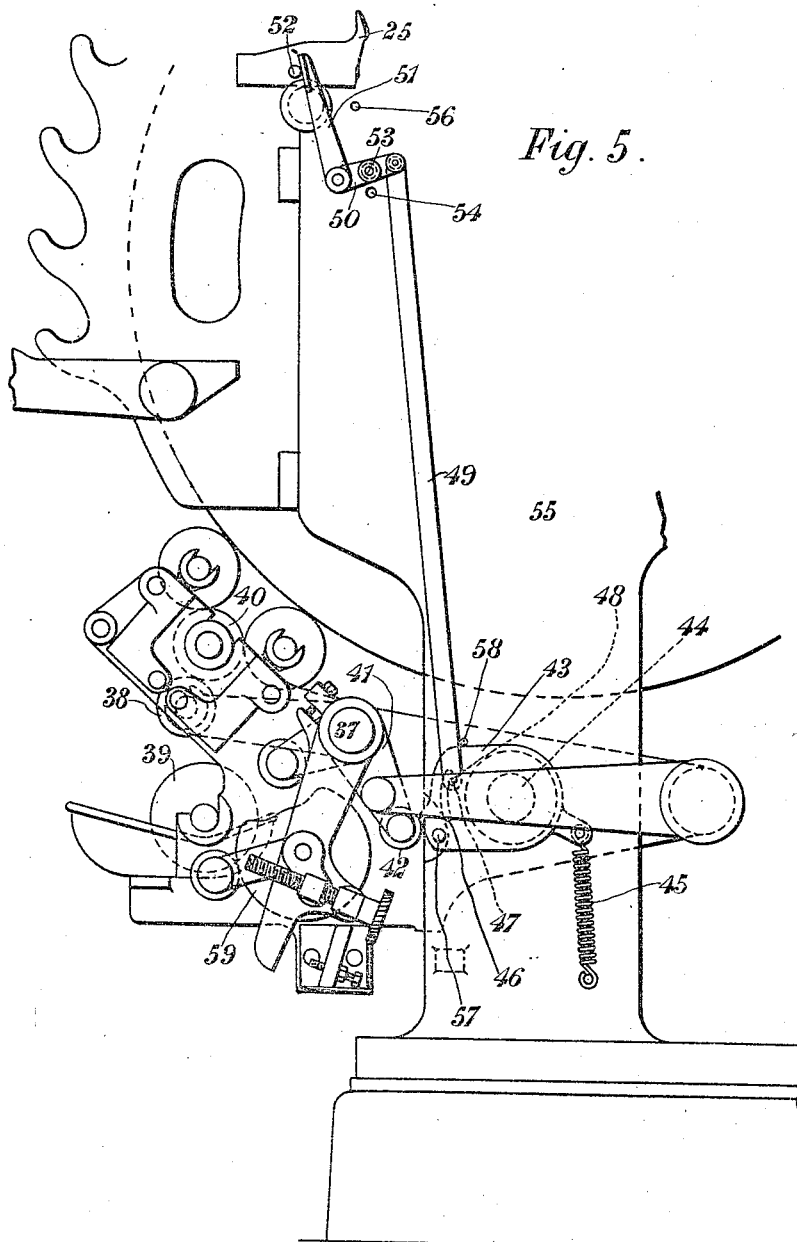
Figure 6:
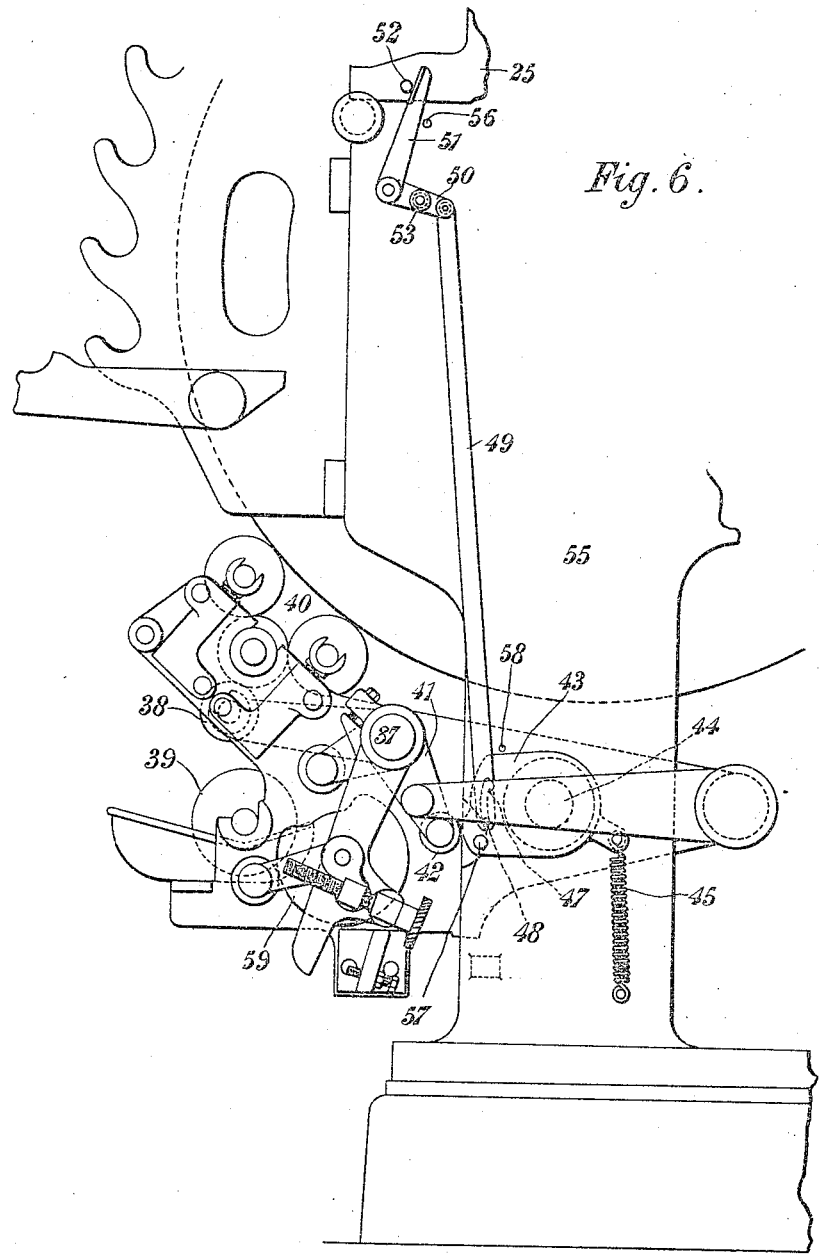
Figure 7:
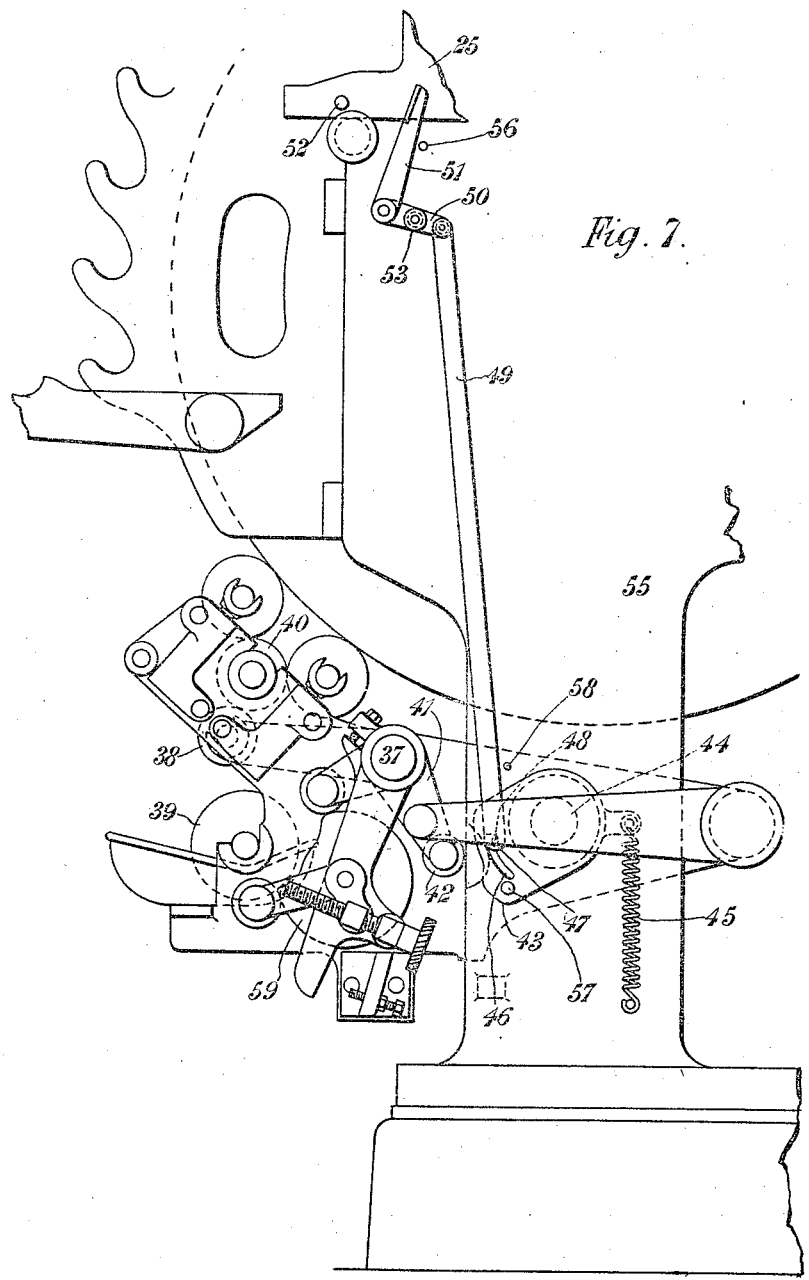
Figure 8:
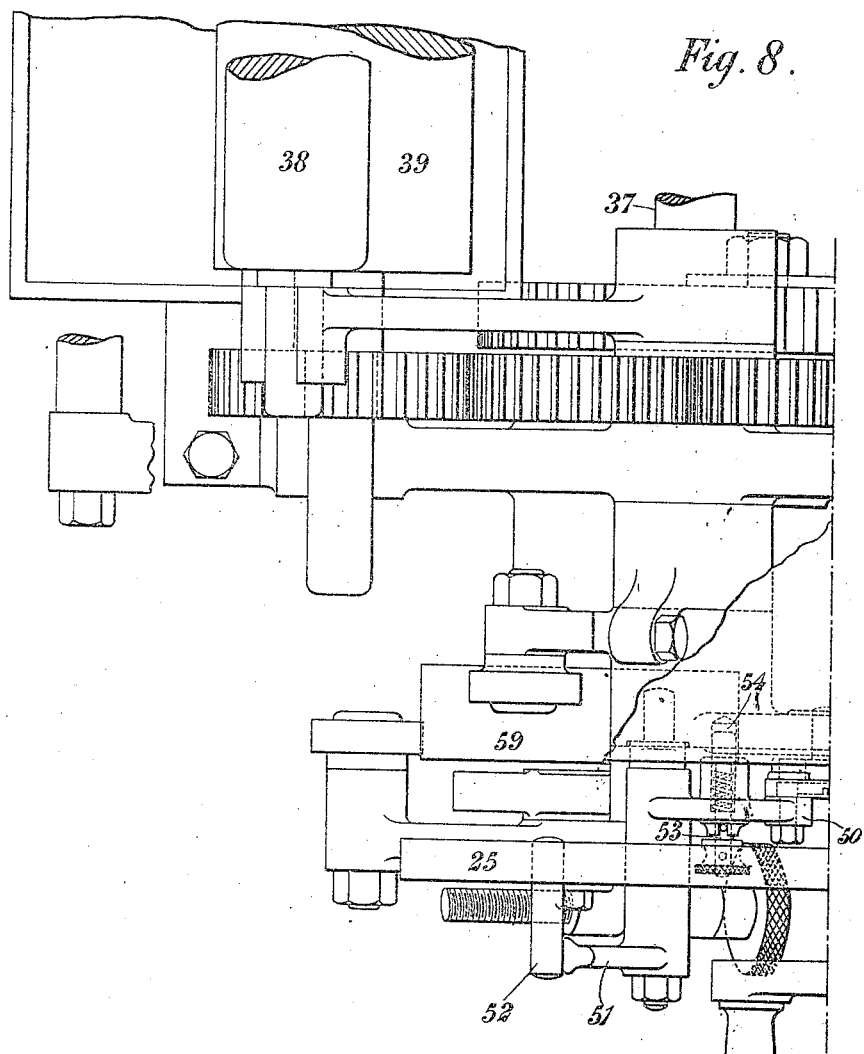

In the accompanying drawings which are to be taken as part of this specification and read therewith:—Figure 1 is a side elevation of as much of a printing machine as is necessary to illustrate the invention; Fig. 2 is a side elevation of part of the apparatus by which the tripping of the inking-rollers is controlled, the said apparatus, in this figure, being represented in a different position of adjustment from that in which it is represented in Fig. 1; Fig. 2ᵃ is a side elevation, partly in section, of detached portions of Fig. 2; Fig. 3 is a view as seen from the left-hand of Fig. 2 with certain parts omitted and other parts shown in positions differing from those in which they are shown in Fig. 2; Fig. 4 is an elevation shown partly in vertical section of part of the apparatus, as seen from the left-hand side of Fig. 1; Figs. 5, 6 and 7 are side elevations of the apparatus for controlling the operation of the water ductor roller, each such figure showing the said apparatus in a different position or at a different phase of its operation; and Fig. 8 is the left-hand portion and Fig. 8ᵃ the right-hand portion of a plan shown partly in horizontal section, of the apparatus for controlling the operation of the water ductor roller, this view being drawn to a scale larger than that to which the other figures are drawn.

In the before-mentioned specification No. 773,970 there is described, and in the drawings accompanying the present specification there is represented, a horizontal rocking shaft 1, extending transversely across the machine beneath the impression cylinder 2 and on which is free to oscillate a segmental gear 3 meshing with a cam-rocked sector 4. This segmental gear 3 is provided with two abutments 3ᵃ, 3ᵇ, Fig. 2ᵃ, capable of engaging with the respectively opposite ends of a double-ended pawl 5 which, at its center, is pivoted, as at 6, to one arm 7 of a bell-crank lever fast on the rocking shaft 1 and whose other arm 8 is operatively connected by a link 9 with the eccentric bearings 10 of the impression cylinder shaft 11. The double-ended pawl 5 is capable of being turned upon its pivot 6 by a suitable lever 12 under the control of the operator. On the rocking shaft 1 there is rigidly secured an arm 13 on which are pivoted two oppositely directed spring-controlled pawls 14, 15 provided with outwardly projecting toes 16, 17 adapted respectively to contact with adjustable abutments 18, 19, situated in their path, the said pawls being adapted to engage with ratchet teeth or abutments 20, 21, respectively, on a disk 22 which is mounted loosely upon the rocking shaft, and which disk, by a rod 23 and lever 24, Fig. 1, is operatively connected with the horizontally adjustable cam bars 25 which serve to raise the inking rollers 26. All these devices or the equivalents thereof, are, as indicated in the accompanying drawings, retained in the present invention which, so far as regards the tripping of the inking rollers 26, consists in means, under the control of the operator, for, when desired, preventing the spring-controlled pawl 15 from engaging its respective ratchet tooth or abutment 21. For this purpose the said pawl 15 is provided with a laterally projecting anti-friction roller 27, and an adjustable curved arm or cam 28 pivoted at one end to a fixed bracket 29, Fig. 3, is adapted to engage this roller to move the pawl 15 (against the action of its spring 30) outward or downward beyond the reach of the ratchet tooth 21. When the arm or cam 28 is in its raised or normal position, its operative or outer surface is concentric or substantially concentric with the axis of the rocking shaft 1 and has no effect upon the pawl 15 which is thus left free to engage with the tooth 21. The vibrating end of the pivoted arm or cam 28 is connected to a spring 31 which normally holds the said arm in its ineffective or raised position, and it is also connected to a rod 32 carrying a foot-tread 33 and a locking pin 34, the latter, as shown in Fig. 2, capable of engaging with a plate or equivalent 35 fast to the underside of the attendant's platform or stand 36.

When it is desired that the inking rollers 26 shall be tripped conjointly with the tripping of the impression cylinder 2, the foot tread 33 is allowed to remain in its uppermost position, as shown in Fig. 1, and consequently this result is attained as heretofore, through the pawl 15 engaging with the tooth 21, when, however, it is desired that the impression cylinder 2 shall be tripped without also the inking rollers 26, as for example when double rolling is necessary, then the foot-tread 33 is depressed, and retained so by engaging the locking pin 34 with the plate 35, as shown in Figs. 2 and 3, so that the pawl 15, by the roller 27 traveling along the then-depressed arm or cam 28, is prevented from engaging with the tooth 21 and therefore from communicating motion to the toothed disk 22, the foot-tread 33 being released by disengaging the pin 34 from the plate 35 and thereby allowed to ascend under the influence of the spring 31, as soon as it is desired that the next tripping of the impression cylinder 2 shall also effect the tripping of the inking rollers 26.

For effecting the before-mentioned stoppage of the supply of water to the printing surface, the cam-operated rocking shaft 37 which, like the corresponding shaft numbered 117 in the before mentioned specification No. 773,970, vibrates the ductor roller 38 from the water fountain roller 39 to the distributer roller 40 and vice versa, has fast thereon a lever arm 41 herein termed a "locking arm" carrying, at its vibrating end, an anti-friction roller 42 adapted to be engaged by a suitable cam 43 free to turn upon a shaft 44 which corresponds with the shaft numbered 90 in the last-named specification. A spring 45 acts upon the cam 43 so as to constantly tend to move its operative part upward, into such a position relatively to the anti-friction roller 42 as to prevent the ductor roller 38, when raised, from descending on to the water fountain roller 39. The cam 43, which is hereinafter referred to as a locking cam, is provided with a slot 46 having a shoulder 47, see particularly Fig. 6, whereon usually rests a pin 48 fast in the lower end of a rod 49, herein termed a "thrust rod" whose upper end is pivoted to one arm 50 of a lever, a second and up-standing arm 51 of which is adapted to engage with a stud 52 fast to one of the before-mentioned cam bars 25; a spring or equivalent means is provided for normally retaining the pin 48, on the slot shoulder 47, but preferably this result is obtained by hollowing out the said shoulder, as shown best in Fig. 6, so that, under the influence of the spring 45 the pin 48 has a constant tendency to remain in the hollow of the shoulder.

The arm 50 of the lever 50, 51 is provided with a plunger 53, see particularly Fig. 8, adapted to enter a hole 54, Fig. 5, in the machine frame 55 for locking the said lever, and when required, preventing its upstanding arm 51 from following the stud 52 with which it is normally in contact, a stop pin 56 may also be provided for limiting the movement of the said arm away from the stud 52. The locking cam 43 may be provided with an outstanding grip or rod 57 for enabling it to be readily depressed by the operator against the action of its spring 45, and a stop 58 is also provided for limiting the movement of the cam 43 under the influence of the said spring.

When the inking rollers 26 are tripped, whether conjointly with, or independently of, the tripping of the impression cylinder 2, the stud 52 on the respective cam bar 25 is moved away from the before mentioned upstanding lever arm 51, with the result that, when the ductor roll 38, is next raised, as ordinarily, by its cam 59 the locking cam 43, by its spring 45, is moved up behind the locking arm 41 as shown in Fig. 5, and will maintain the ductor roller 38 in its raised position, preventing it from descending on to the water fountain roller 39, until the inking rollers shall be next untripped.

When it is desired to stop the supply of water to the printing surface during the otherwise normal working of the printing machine, the operator moves the thrust rod 49 laterally (toward the left in Figs. 1, 5 and 7) so as to disengage its pin 48 from the slot shoulder 47, so that when next the ductor roller 38 is raised, the locking cam 43, under the influence of its spring 45, will be moved behind the locking arm 41 as shown in Fig. 6, and will thereby maintain the ductor roller 38 in its raised position out of contact with the water fountain roller 39, this condition of working continuing until the locking cam 43 is next depressed by the operator, and the pin 48 is caused to reengage the slot shoulder 47.

When it is desired to trip the inking rollers 26 without affecting the damping mechanism, the plunger 53 is inserted in the hole 54 in the machine frame, and consequently, as shown in Fig. 7, the before-mentioned upstanding lever arm 51 is locked back and prevented from following the stud 52 on the adjacent adjustable cam bar 25.

In respects other than those hereinbefore particularized, the various parts of the apparatus represented in the accompanying drawings are constructed and operate substantially as described in the before mentioned specifications, the only material difference being in the next described means by which the lever 12 is operated, these means, however, constitute no part of the present invention. In the arrangement illustrated in the accompanying drawings the lever 12 is rigidly secured to a rocking shaft 59 on which is also fixed a downwardly-extending arm 60 the lower end of which engages between two collars 61, 62, the former loose and the latter fast upon a horizontally movable rod 63, these collars being respectively acted upon by the inner ends of two springs 64, 65 whose outer ends respectively bear against the collar 66 fast on the rod 63 and a standard 67 which, conjointly with the second standard 68, serves to support the rod 63 and guide it in its horizontal movement. On the right hand end of the rod 63, as shown in Fig. 1, is secured a collar 69 with which engages one arm of a lever 70 whose other arm is pivoted to the lower end of a rod 71 which projects to the upper side of the platform 36, where, at its upper end, it is provided with a foottread 72.

I claim,

1. The combination of coöperating printing and impression cylinders, inking rollers coöperating with the printing cylinder, tripping means for said impression cylinder, tripping means for said inking rollers, a cam operatively fast to one of the cylinders, driving gear operatively connected with the cam and with both of said tripping means and adapted to operate both of the latter simultaneously, controlling means governing the said driving gear for rendering said gear operative or inoperative, and controlling means governing said inking roller tripping gear only, whereby the inking rollers may either not be tripped or be directly tripped by the cylinder tripping means.

2. In a printing machine the combination with the impression cylinder, mechanism adapted to trip the impression cylinder, the inking rollers, a pivoted disk adapted to effect the tripping of the inking rollers, and a pawl adapted normally to operate the disk to effect such tripping of the inking rollers when the impression cylinder is being tripped, of a device under the control of the operator adapted to prevent the pawl from operating the disk when the impression cylinder is being tripped.

3. In a printing machine the combination with ductor, water fountain and distributing rollers, and a rocking shaft adapted to vibrate the ductor roller into contact alternately with the water fountain roller and the distributer roller, of an arm fast to the rocking shaft, a spring-actuated cam adapted to engage the arm for holding the ductor roller out of contact with the water fountain roller, and an adjustable device adapted to normally hold the cam in its inoperative position and to release it for engaging with the above named arm.

4. In a printing machine the combination of inking rollers, means adapted to trip the inking rollers, ductor, water fountain and distributing rollers, a rocking shaft adapted to vibrate the ductor roller into contact alternately with the water fountain roller and the distributer roller, an arm fast to the rocking shaft, a spring-actuated cam adapted to engage the arm for holding the ductor roller out of contact with the water fountain roller, and an adjustable device in operative connection with the inking roller tripping means, adapted to normally hold the cam in its inoperative position and to release it for engaging with the above-named arm.

5. In a printing machine the combination of impression cylinder, means adapted to trip the impression cylinder, inking rollers, means adapted to trip the inking rollers, ductor, water fountain and distributing rollers, a rocking shaft adapted to vibrate the ductor roller into contact alternately with the water fountain roller and the distributer roller, an arm fast to the rocking shaft, a spring-actuated cam adapted to engage the arm for holding the ductor roller out of contact with the water fountain roller, and an adjustable device in operative connection with the inking roller tripping means, adapted to normally hold the cam in its inoperative position and to release it for engaging with the above named arm.

6. In a printing machine the combination of inking rollers, a longitudinally adjustable cam bar adapted to trip the inking rollers, ductor, water fountain and distributing rollers, a rocking shaft adapted to vibrate the ductor roller into contact alternately with the water fountain roller and the distributer roller, devices adapted to hold the ductor roller out of contact with the water fountain roller, and devices operatively connecting the last-named devices with the cam bar and adapted to hold the ductor roller out of contact with the water fountain roller when the inking rollers are tripped.

7. In a printing machine the combination of inking rollers, a longitudinally adjustable cam bar adapted to trip the inking rollers, ductor, water fountain and distributing rollers, a rocking shaft adapted to vibrate the ductor roller into contact alternately with the water fountain roller and the distributer roller, a cam adapted to hold the ductor roller out of contact with the water fountain roller, a device tending to constantly move the cam into position for fulfilling the last named function, a rod operatively connecting the cam with the cam bar and an adjustable slidable connection between the cam and the rod.

8. In a printing machine the combination of inking rollers, a longitudinally adjustable cam bar adapted to trip the inking rollers, ductor, water fountain and distributing rollers, a rocking shaft adapted to vibrate the ductor roller into contact alternately with the water fountain roller and the distributer roller, a cam adapted to hold the ductor roller out of contact with the water fountain roller, a device tending to constantly move the cam into position for fulfilling the last-named function, a slot in the cam, a shoulder at one side of the slot, a rod operatively connecting the cam with the cam bar, a projection on the rod normally engaging with the shoulder, a bell-crank lever in pivotal connection with the rod, a projection on the cam bar adapted to be engaged by the bell-crank lever, and devices adapted to lock the bell-crank lever out of engagement with the cam bar projection.

9. A printing machine having in combination an impression cylinder, mechanism adapted to trip the impression cylinder, inking rollers, mechanism adapted to automatically trip the inking rollers conjointly with the tripping of the impression cylinder, mechanism capable of being adjusted to allow of either the said conjoint operation or of the tripping of the impression cylinder independently of that of the inking rollers, ductor, water fountain and distributing rollers, mechanism adapted to move the ductor roller from the water fountain roller to the distributer roller and vice versa, an adjustable device adapted in one position to allow the ductor roller to descend to the ink fountain roller and in another position to prevent such descent, an adjustable connection between the said device and the mechanism for tripping the inking rollers whereby the last-named operation is caused to control the operation or adjustment of the said device, and means adapted to render ineffective the said adjustable connection.

In witness whereof I have hereunto set my hand in the presence of two witnesses.

THOMAS ROBERT GILLETT PARKER.

Witnesses:
WILLIAM EDWARD BENNISON,
HARRY WILLIAM WOODFIELD.